US011235647B2

(12) United States Patent
Ledwell et al.

(10) Patent No.: US 11,235,647 B2
(45) Date of Patent: Feb. 1, 2022

(54) TRUCK LOAD BED WITH SIDE OPENING GULL WING DOORS

(71) Applicant: Ledwell and Son Enterprises, Inc., Texarkana, TX (US)

(72) Inventors: Stephen Hardy Ledwell, Texarkana, TX (US); Gary Gene Gathright, Texarkana, TX (US); Michael Leroy Thomas, Simms, TX (US)

(73) Assignee: LEDWELL AND SON ENTERPRISES, INC., Texarkana, TX (US)

( * ) Notice: Subject to any disclaimer, the term of this patent is extended or adjusted under 35 U.S.C. 154(b) by 0 days.

(21) Appl. No.: 16/881,723

(22) Filed: May 22, 2020

(65) Prior Publication Data

US 2021/0362570 A1 Nov. 25, 2021

(51) Int. Cl.
*B60J 5/04* (2006.01)
*E05F 3/22* (2006.01)

(52) U.S. Cl.
CPC ........... *B60J 5/0498* (2013.01); *B60J 5/0473* (2013.01); *B60J 5/0491* (2013.01); *E05F 3/224* (2013.01)

(58) Field of Classification Search
CPC ...... B60J 5/0498; B60J 5/0473; B60J 5/0491; E05F 3/224
USPC ...................................... 296/186.4
See application file for complete search history.

(56) References Cited

U.S. PATENT DOCUMENTS

| | | | | |
|---|---|---|---|---|
| 2,606,786 A | * | 8/1952 | Howard | B60J 5/0498 296/61 |
| 2,815,243 A | * | 12/1957 | Campbell | B60J 1/14 296/190.11 |
| 4,526,417 A | * | 7/1985 | Dinkel | B60J 5/0498 105/378 |
| 4,682,811 A | * | 7/1987 | Ooguro | B60J 5/0498 296/186.4 |
| 6,234,508 B1 | * | 5/2001 | Tuttle | A01B 59/004 280/406.1 |
| 6,247,747 B1 | * | 6/2001 | Kawanomoto | B60J 5/0498 296/191 |

(Continued)

FOREIGN PATENT DOCUMENTS

| | | | | |
|---|---|---|---|---|
| DE | 2601128 A1 | * | 7/1976 | ............ B60J 5/0498 |
| DE | 9108949 U1 | * | 11/1991 | ............ B60J 5/0498 |

(Continued)

OTHER PUBLICATIONS

Machine translation KR 207 (Year: 2003).*

*Primary Examiner* — Hilary L Gutman
(74) *Attorney, Agent, or Firm* — Leason Ellis LLP (57) ABSTRACT

An enclosure for protecting a load comprises a truck bed to hold items, a front wall affixed to a proximal end of a width of the truck bed, and a rear wall affixed to a distal end of the width. A main header member runs along the length of the truck bed connecting the rear and front walls to form a central mounting point along a length of the truck bed that is disposed at a maximum height of the rear wall and the front wall. A passenger side gull wing door and a driver side gull wing door are mounted to the main header member by a plurality of hinges affixed to the main header member and which provide a movable joint for the gull wing doors. One or more hydraulic lift cylinders are operative to raise and lower a respective gull wing door.

13 Claims, 9 Drawing Sheets

(56) References Cited

U.S. PATENT DOCUMENTS

| | | | |
|---|---|---|---|
| 6,554,346 B2 * | 4/2003 | Sugimoto | B60J 5/0498 296/147 |
| 10,286,829 B2 * | 5/2019 | Choi | B60P 3/205 |
| 10,415,710 B2 * | 9/2019 | Kobayashi | F16K 3/26 |
| 10,723,546 B2 * | 7/2020 | Wegener | B65D 88/542 |
| 2007/0278823 A1 * | 12/2007 | Hori | B60J 5/0498 296/186.4 |
| 2009/0056476 A1 * | 3/2009 | Glass | G01L 5/06 73/862.391 |
| 2009/0218777 A1 * | 9/2009 | Wood | B64C 1/06 280/93.51 |

FOREIGN PATENT DOCUMENTS

| | | | | |
|---|---|---|---|---|
| DE | 102008049135 A1 * | 4/2010 | | B60J 5/0498 |
| FR | 2615471 A1 * | 11/1988 | | B60J 5/0498 |
| FR | 2653715 A1 * | 5/1991 | | B60J 5/0498 |
| GB | 2152448 A * | 8/1985 | | B60J 5/0498 |
| KR | 2003033207 A * | 5/2003 | | |

\* cited by examiner

TRUCK LOAD BED WITH SIDE OPENING GULL WING DOORS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The inventions described herein generally relate to enclosures for truck beds. More specifically, inventions disclosed and described herein relate to a set of side-opening gull wing doors that are affixed to a truck bed to enclose a load contained therein.

DESCRIPTION OF THE RELATED ART

Prior art truck bed systems are typically formed of a floor, right and left sidewalls, a top wall and front wall. The end of the truck bed that is distal to the truck cab is open, with a sliding door affixed to a set of rails. An operator, either manually or through the use of a power assist device, can raise or lower the sliding door to expose the interior and any load that is disposed therein upon the truck bed. Disadvantageously, all cargo disposed upon the truck bed can only be removed via the distal opening. Accordingly to remove palletized loads or other goods that are located on portion of the truck bed that is located proximal to the truck cab, an operator must move the pallet or other goods across the entire distance of the truck bed, which can lead to a number of inefficiencies, including damage of goods as they are being removed from the interior of the enclosure.

Other designs provide for removal of a load disposed upon the truck bed from the sides of the truck bed, as opposed to from the distal end of the truck bed. In such configurations, a frame is welded or otherwise affixed to the truck bed, which may include the use of a top affixed to the frame and one or more flexible sidewalls engaged to enclose the load, e.g., plastic or tarpaulin sheeting. When the operator needs to load or unload goods onto the truck bed, he or she retracts one or both of the flexible sidewalls, for example, by rolling onto a roller disposed along a top or bottom edge of the frame. As such, the operator has immediate access to goods regardless of where they have been placed upon the truck bed. Where the operator needs to lift or otherwise raise the load in order to load or offload such goods, however, the load may be blocked by the frame, causing unintended damage to the goods, frame of the enclosure, or both. Also, there are other inefficiencies with operating truck beds of this type, such as decreased fuel economy and the possibility of goods escaping or coming free from a truck bed that is not fully enclosed.

Accordingly, there is a need in the art for a truck bed enclosure that allows for access to goods regardless of where they have been placed upon the truck bed, while providing full enclosure and sufficient clearance to load and unload all types of goods, regardless of the manner in which they are packaged, e.g., palletized, etc.

SUMMARY OF THE INVENTION

Embodiments of the invention disclosed herein are directed towards an enclosure for a truck bed that generally comprises a truck bed, front and rear walls, the front wall being proximal to the truck cab and the rear wall being distal to the truck cab, with a mounting ridge that connects the front wall with the rear wall. A hinge is welded or otherwise affixed to both sides of the mounting ridge, with a passenger-side and driver-side gull wing door affixed to the hinge.

A given one of the gull wing doors, as is described and illustrated in greater detail herein, is generally formed of two perpendicularly mated metal sheets (or a single, formed metal sheet), each of which is sized to match the length of the truck bed. When both of the gull wing doors are in the closed position, the truck bed gives the appearance of a generally rectangular shape, e.g., industry standard rectangular box truck. When in the open position, however, the entirety of the truck bed is accessible with additional clearance provided for removing goods from the truck bed.

According to one embodiment, the invention is directed towards an enclosure for protecting a load disposed upon a truck bed. The enclosure in accordance with the present embodiment comprises a truck bed to hold one or more items, the truck bed having a first end proximal to a truck cab and a second end distal to the truck cab, with a front wall affixed to the proximal end of the truck bed and a rear wall affixed to the distal end of the truck bed. A main header member runs along the length of the truck bed and connects the rear wall with the front wall to form a central mounting point along a length of the truck bed that is disposed at a maximum height of the rear wall and the front wall. According to various embodiments, the main header member may take a number of various, disparate forms including, but not limited to, a tubular member, a rectangular member, etc.

A passenger side gull wing door and a driver side gull wing door are provided in conjunction with a plurality of hinges affixed to the main header member to thereby provide a movable joint on which the passenger side gull wing door and the driver side gull wing door may be mounted. A hydraulic lift cylinder is operative to raise and lower a respective passenger side gull wing door or driver side gull wing door. Alternatively, one or more pairs of hydraulic lift cylinders are operative to raise and lower a respective passenger side gull wing door or driver side gull wing door.

The presently disclosed design presents concepts and ideas that improve upon existing enclosed truck bed egress/ingress designs in operation, mechanical advantage, fabrication and installation, weather protection and speed of deployment. Accordingly, embodiments of the present invention provide the advantages of the prior art systems while eliminating the drawbacks associated therewith.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF EMBODIMENTS THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized, and structural changes may be made without departing from the scope of the present invention. Likewise, a reasonably broad scope for claimed or covered subject matter is intended. Among other things, for example, subject matter may be embodied as methods, devices, components, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Figure 1:
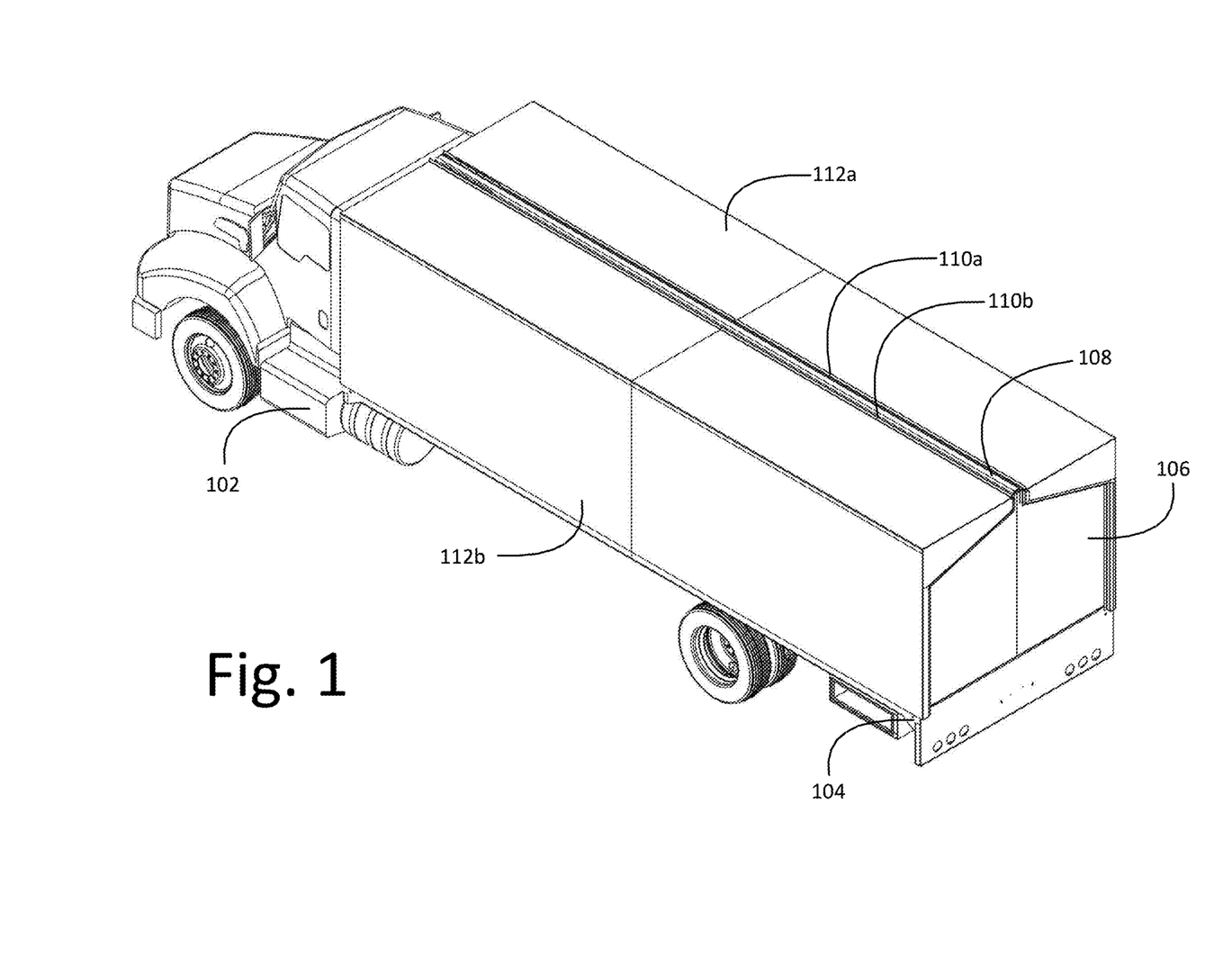
FIG. 1 illustrates an isometric view of gull wing doors for a truck bed in a closed position according to one embodiment of the present invention.

FIG. 1 illustrates an isometric view of gull wing doors for a truck bed enclosure in a closed position according to one embodiment of the present invention. According to the embodiment that FIG. 1 illustrates, a truck bed 104 is used to hold and move goods, e.g., palletized goods. The truck bed 104 interfaces with a rear wall 106 that is distal to the back of the truck cab 102 and a front wall (not pictured) that is proximal to the back to the truck cab 102. Running along the length of the truck bed and connecting the rear wall 106 with the front wall is a main header member 108, which forms a central mounting point along the length of the truck bed that is disposed at the maximum height of the rear wall 106 and the front wall and generally running parallel to the plane of the truck bed. Embodiments may mount the main header member 108 at alternative locations at the rear wall 106 and the front wall.

Affixed to the main header member 108 are a passenger side hinge 110a and a driver side hinge 110b. According to one embodiment, the hinges 110a and 110b are multi-barrel hinges, similar to one or more sections of piano hinge. Each of the passenger side hinge 110a and the driver side hinge 110b may be continuous along the respective edge of the main header member 108, or be affixed to one or more segments of the main header member 108, also with different configurations on the passenger side hinge 110a versus the driver side hinge 110b. The purpose of each of the passenger side hinge 110a and the driver side hinge 110b is to provide a movable joint on which a passenger side gull wing door 112a and a driver side gull wing door 112b, respectively, may be mounted. Each of the passenger side hinge 110a and the driver side hinge 110b allows the passenger side gull wing door 112a and the driver side gull wing door 112b, respectively, to swing up along the hinge point as each is opened or closed.

In order to seal the interior volume against the elements, a tarp or similar plastic sheeting may be affixed to the outer shell of the passenger side gull wing door 112a and the driver side gull wing door 112b. For example, affixing a generally rectangular sheet of canvas sized to cover a portion of the surface area of a given gull wing 112a and 112b may be mounted to the main header member 108 along one length and to an opposite edge on a respective gull wing door 112a and 112b along the other length. Alternatively, the sheet of canvas or similar cover may be sized to only cover the length of the main header member 108 and respective hinge 110a and 110b. Either arrangement is operative to cover or otherwise seals against any gaps that may form between the main header member 108 and a given gull wing 112a and 112b by way of the respective hinges 110a and 110b. In accordance with still further embodiments, the sheet of canvas or similar cover runs the length (or a portion) of the truck bed and is mounted to one of the gull wing doors 112a and 112b along one length and to an opposite edge on a respective gull wing door 112a and 112b along the other length such that any gap between a given door and its respective hinge is fully covered by the sheet.

According to one embodiment, a given one of the passenger side gull wing door 112a and the driver side gull wing door 112b are each a self-supporting structure that utilizes an internal skeletal tubing frame to create clear span across approximately one half of the maximum width of the truck bed 104 and encompassing the entire length of the truck bed 104. Moreover, as depicted, a given one of the passenger side gull wing door 112a and the driver side gull wing door 112b are a one-piece door and do not require a second section that folds down, such as with a tailgate. This construction provides a door frame that is operator friendly and, as described in greater detail herein, allows for opening and closing of the gull wing doors 112a and 112b, which may comprise independent opening and closing, with little operator involvement.

The passenger side gull wing door 112a and the driver side gull wing door 112b, along with the associated supporting framework, e.g., main header member 108, hinges 110a and 110b, front wall and rear wall 106 can be mounted on a wide variety of flat deck beds, thereby creating a weathertight enclosure. For example, in accordance with the embodiment of FIG. 1 the truck bed 104 interfaces with the truck cab 102 to form a unified assembly. In accordance with alternative embodiments, the truck bed 104 is independent of the truck cab 102, e.g., in a "trailer" configuration that interfaces with a tractor unit to haul the freight disposed within the trailer.

Figure 2:
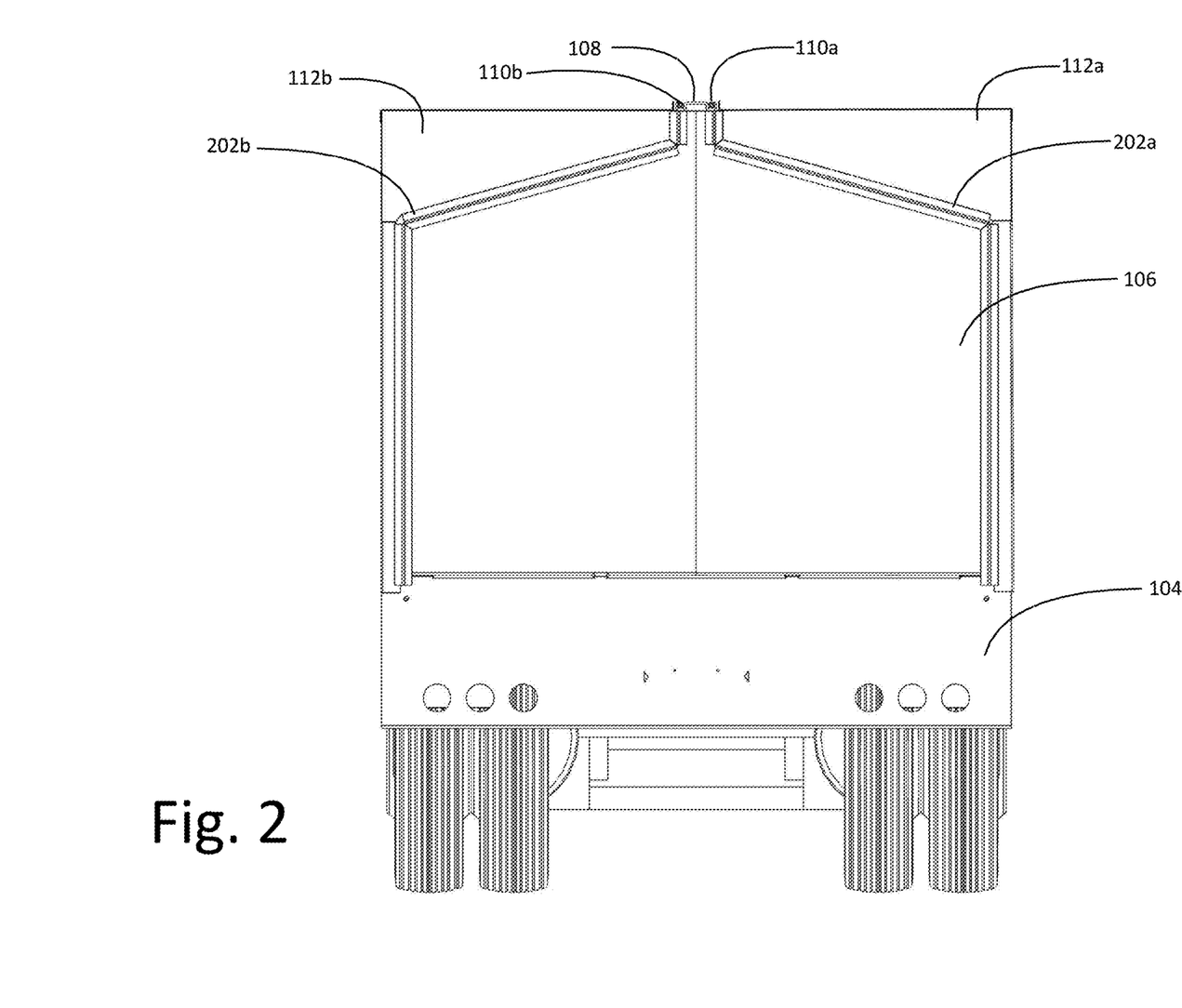
FIG. 2 illustrates a rear view of a truck bed affixed with gull wing doors in a closed position according to one embodiment of the present invention.

FIG. 2 illustrates a rear view of a truck bed affixed with gull wing doors in a closed position according to one embodiment of the present invention. As seen in the embodiment of FIG. 2, each of the passenger side gull wing door 112a and driver side gull wing door 112b are aligned to engage with the rear wall 106, which is mounted flush with the far edge of the truck bed 104. From the rear view, however, the main header member 108, although affixed to the rear wall, is partly visible in conjunction with the passenger side hinge 110a and the driver side hinge 110b.

Running along a passenger side of the rear wall 106 and a driver side of the rear wall 106 are two weather resistant lips 202a and 202b. In the closed position, a side of each gull wing door distal from the truck cab engages with the rear wall 106, covering a portion of the rear wall in the closed position. A given one of the two weather resistant strips run along the rear wall to engage with a lower portion of the distal side of the gull wing door, sealing any gap between a given gull wing door and the rear wall 106 of the enclosure. Similarly, but not pictured, are two corresponding weather resistant strips that run along the front wall proximal to the rear of the truck cab.

As described above, a tarp, sheet of plastic or other similar sheet or barrier is placed between the main header member 108 and a given one of the passenger side gull wing door 112a and driver side gull wing door 112b to prevent the elements from entering any gap or opening created by the hinges 110a and 110b. There are instances, however, where precipitation penetrates such barrier and finds entry into the interior volume created by the assembly disclosed herein. As is described in greater detail herein, an internal drainage system routes any such precipitation from the underside of the hinge 110a and 110b area located at the interface of the main header member 108 and each of the passenger side gull wing door 112a and driver side gull wing door 112b back, down to drain through the internal structure of the rear wall 106, thereby ensuring precipitation is isolated from the interior volume. It should be noted by those of skill in the art that embodiments of such internal drainage system may also or alternatively route precipitation that penetrates such barrier forward to drain through an internal structure of the front wall.

Figure 3:
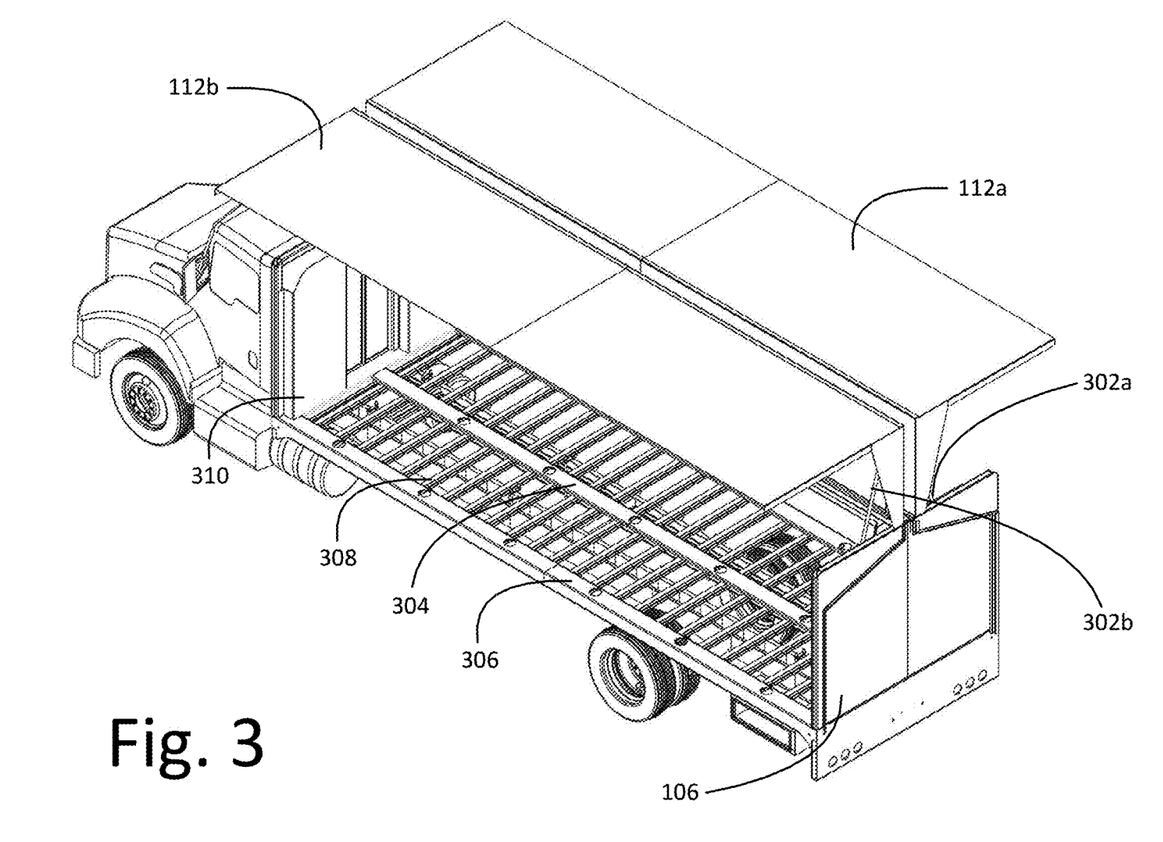
FIG. 3 illustrates an isometric view of gull wing doors for a truck bed in an open position according to one embodiment of the present invention.

Similar to FIG. 1, FIG. 3 illustrates an isometric view of gull wing doors 112a and 112b for a truck bed in an open or raised position according to one embodiment of the present invention. According to the present embodiment, a given one of the gull wing doors 112a and 112b operate from a pair of hydraulic lift cylinders 302a and 302b, respectively, which may be located underneath and/or on the truck bed, pushing upwards from the floor or deck of the truck bed. A given gull wing door 112a and 112b, attached to the main header member by way of one or more hinges, is operative to pivot on this centrally located member such that the given gull wing door 112a and 112b rotates in an arc approaching ninety (90) degrees from full closed to fully open.

According to one embodiment, each of the passenger side gull wing door 112a and the driver side gull wing door 112b operate independently and can therefore independently be in an open or closed orientation. Alternatively, the lift cylinders 302a and 302b operate in a dependent fashion, with both the passenger side gull wing door 112a and the driver side gull wing door 112b together in the open position or closed position. Although the use of hydraulic lift cylinders pushing up provides for a maximum mechanical advantage to operate the doors through their entire movement arc, other power sources fall within the scope of the invention and may be utilized in conjunction with, or as an alternative to, the hydraulic lift cylinders 302a and 302b.

The interior volume of the assembly is visible as the gull wing doors traverse their respective movement arcs in moving from the closed to the open position. In the present embodiment, the floor of the truck bed comprises a central member 304 and two side members, of which side member 306 is visible given the isometric view of the assembly. Running the length of the truck bed between each of the central member 304 and the side member 306 are a plurality of slats 308 or cross members the provide rigidity to the truck bed while at the same time not fully sealing the interior volume that the assembly forms. Beyond flooring comprised of a plurality slats 308 or cross members, other embodiments utilize flooring made of various types of materials, which can be utilized in conjunction with slats 308, for example, wood plank decking, metal, etc., as well as various combinations thereof.

Goods, e.g., palletized loads, are loaded upon the floor structure formed by the central member 304, side members 306 and slats 308. Also visible in the interior volume is one of several cylinder covers 310 that at least partially enclose a given one of the hydraulic lift cylinders 302a and 302b to protect such cylinders from abrasion or damage from loading goods onto the truck bed or from the goods themselves, e.g., as a result of unintended movement during transit.

Figure 4:
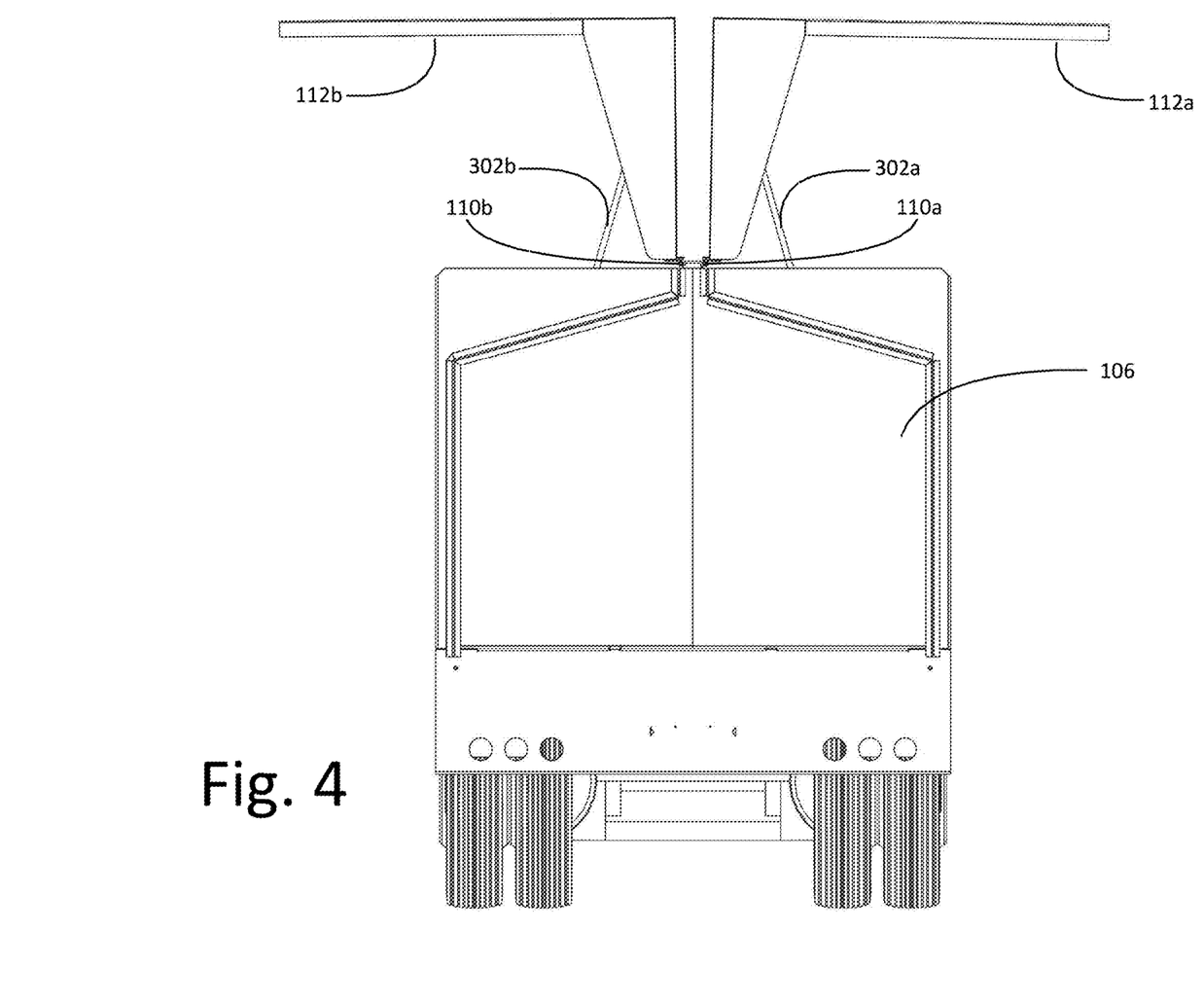
FIG. 4 illustrates a rear view of a truck bed affixed with gull wing doors in an open position according to one embodiment of the present invention.

Similar to FIG. 2, FIG. 4 illustrates a rear view of a truck bed affixed with gull wing doors in an open position according to one embodiment of the present invention. Each of the passenger side gull wing door 112a and driver side gull wing door 112b are visible over the top of the rear wall 106 as they have each been rotated in an arc ninety (90) degrees from their respective closed positions. As with the closed position, the main header member 108, although affixed to the rear wall, is still partly visible in conjunction with the passenger side hinge 110a and the driver side hinge 110b. Also exposed in the open position, however, are a respective hydraulic lift cylinder 302a and 302b that, in the present embodiment, has extended to mechanically lift the passenger side gull wing door 112a and the driver side gull wing door 112b into the open position.

Figure 5:
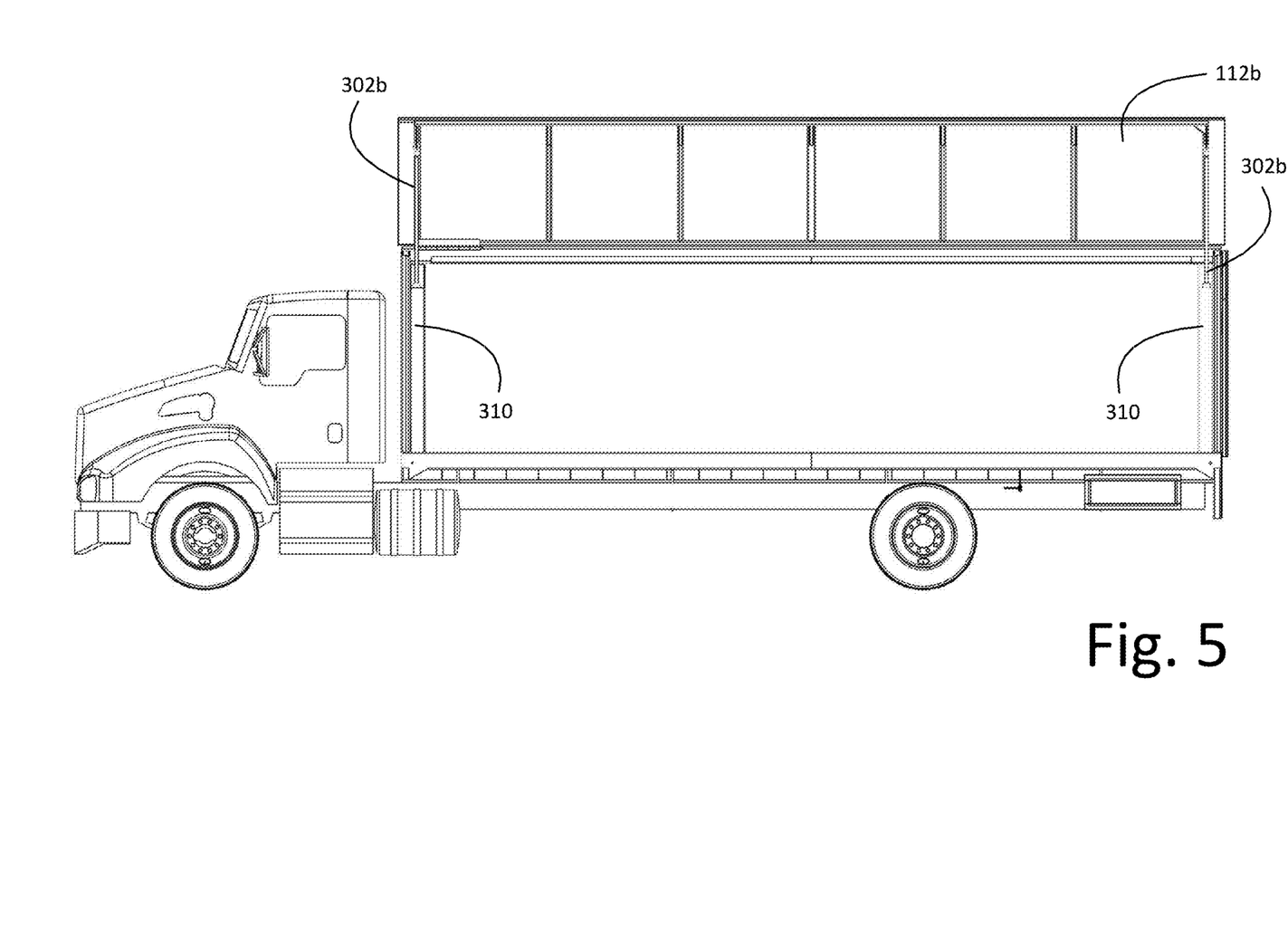
FIG. 5 illustrates a driver-side view of a truck bed affixed with gull wing doors in an open position according to one embodiment of the present invention.

FIG. 5 illustrates a driver-side view of a truck bed affixed with gull wing doors in an open position according to one embodiment of the present invention. As with the rear view of FIG. 4, FIG. 5 illustrates an embodiment of the present invention in which both the passenger side gull wing door 112a and the driver side gull wing door 112b are in the open position. Also, in accordance with the present embodiment, the driver side gull wing door 112b is raised and lowered by a pair of hydraulic lift cylinders 302b, each protected by a respective cylinder cover 310. When both the passenger side gull wing door 112a and the driver side gull wing door 112b are in the open position, an operator can pass any load contained on the truck bed across the width of the truck and can move goods off the truck bed regardless of the location of such goods on the truck bed.

Figure 6:
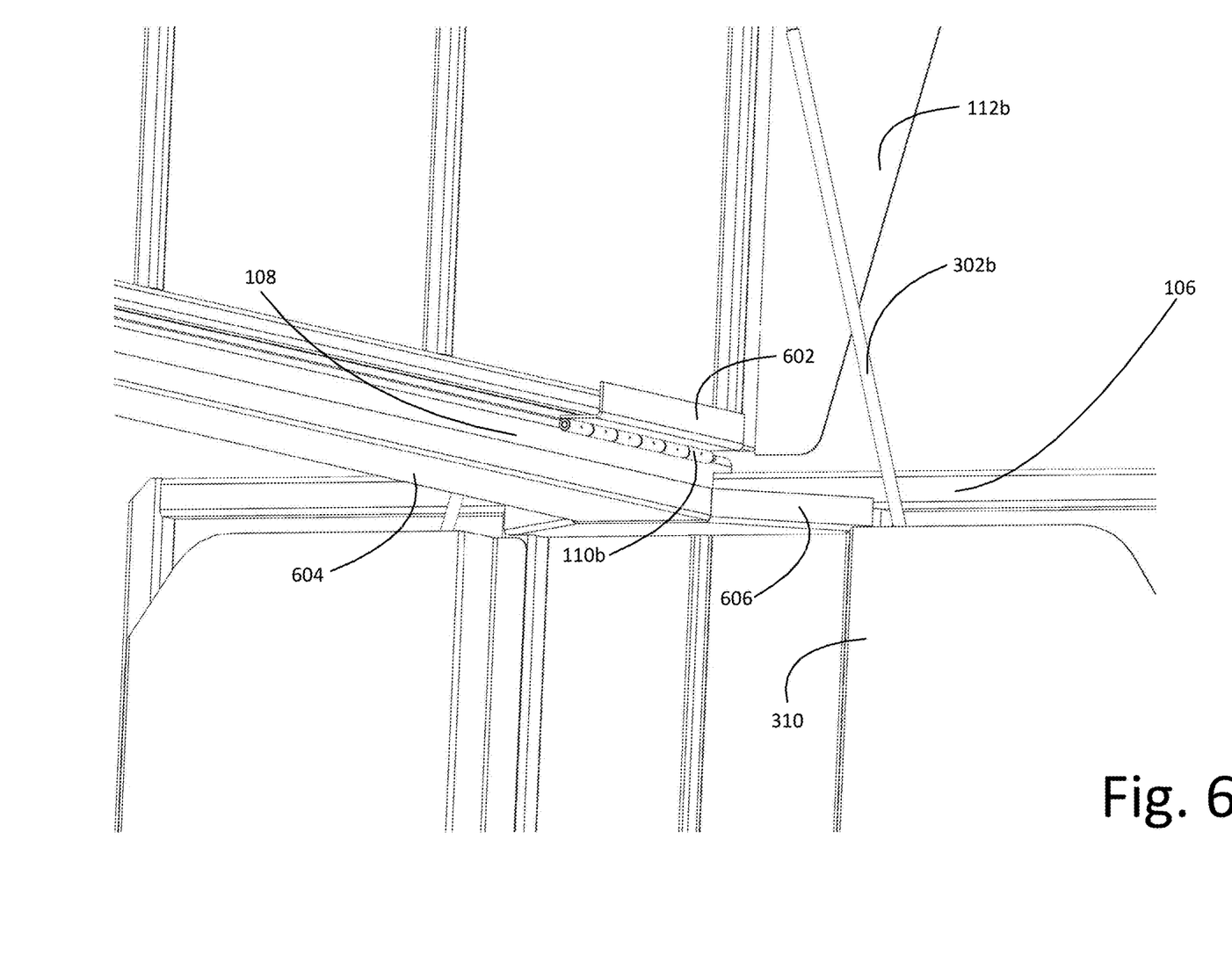
FIG. 6 illustrates a detailed inside view of a driver-side gull wing door in an open position according to one embodiment of the present invention.

FIG. 6 provides a detailed inside view of the driver-side gull wing door in an open position and illustrating the components comprising the door assembly according to one embodiment of the present invention. More specifically, the view of FIG. 6 is from that of an observer standing on driver side of the truck bed and looking towards the rear wall 106 at the point where the main header member 108 interfaces with the rear wall 106.

As indicated previously, a respective gull wing door 112b is raised to the open position when the hydraulic lift cylinder 302b, protected by its respective cylinder cover 310, is extended. The gull wing door 112b moves in an arc around the hinge 110b, which is itself affixed to the main header member 108. The hinge 110b according to one embodiment is a barrel hinge in which a number of barrels are affixed to the main header member 108 and other barrels are affixed to a flange 602. The two sets of barrels are interleaved and a pin set therethrough to connect the two structures together. According to one embodiment the flange 602 is a right-angle flange and the gull wing door 112b is affixed, such as by welding, to the right angle flange 602, which allows mounting of the gull wing door 112b below the hinge 110b and closure flush against main header member 108 when in the closed position.

With a given gull wing door 112b attached to the main header member 108 via the hinge 110b, it is necessarily spaced away from the tube surface. As described above, this resultant gap may be covered by one or more sheets of materials of various types and sizes to cover such gap, yet provide the requisite flexibility so as to move in conjunction with the movements of a given gull wing door 112a and 112b. This cover primarily prevents entry of rainwater and other precipitation into the interior volume formed by the assembly, e.g., gull wing doors, front and rear walls, and the truck bed. As a secondary defense, a drain trough 604 may be attached to the bottom of the main header member 108, collecting any water that falls through the gap and routing it towards the rear wall 106. The drain trough 604 may flare 606 towards the passenger side and the driver side as it approaches the rear wall, which allows the drain trough 604 and 606 to properly interface with drain structures that move precipitation away from the interior of the structure. According to one embodiment, such drainage is accomplished by routing precipitation through the internal structure of the rear wall 106, which may make use of one or more drainage downspouts, each of which may run along an outer, inner, or internal surface of the rear wall 106. Accordingly, the drain trough 604 and downspouts route water out, down, and away from any load contained in the interior volume.

Figure 7:
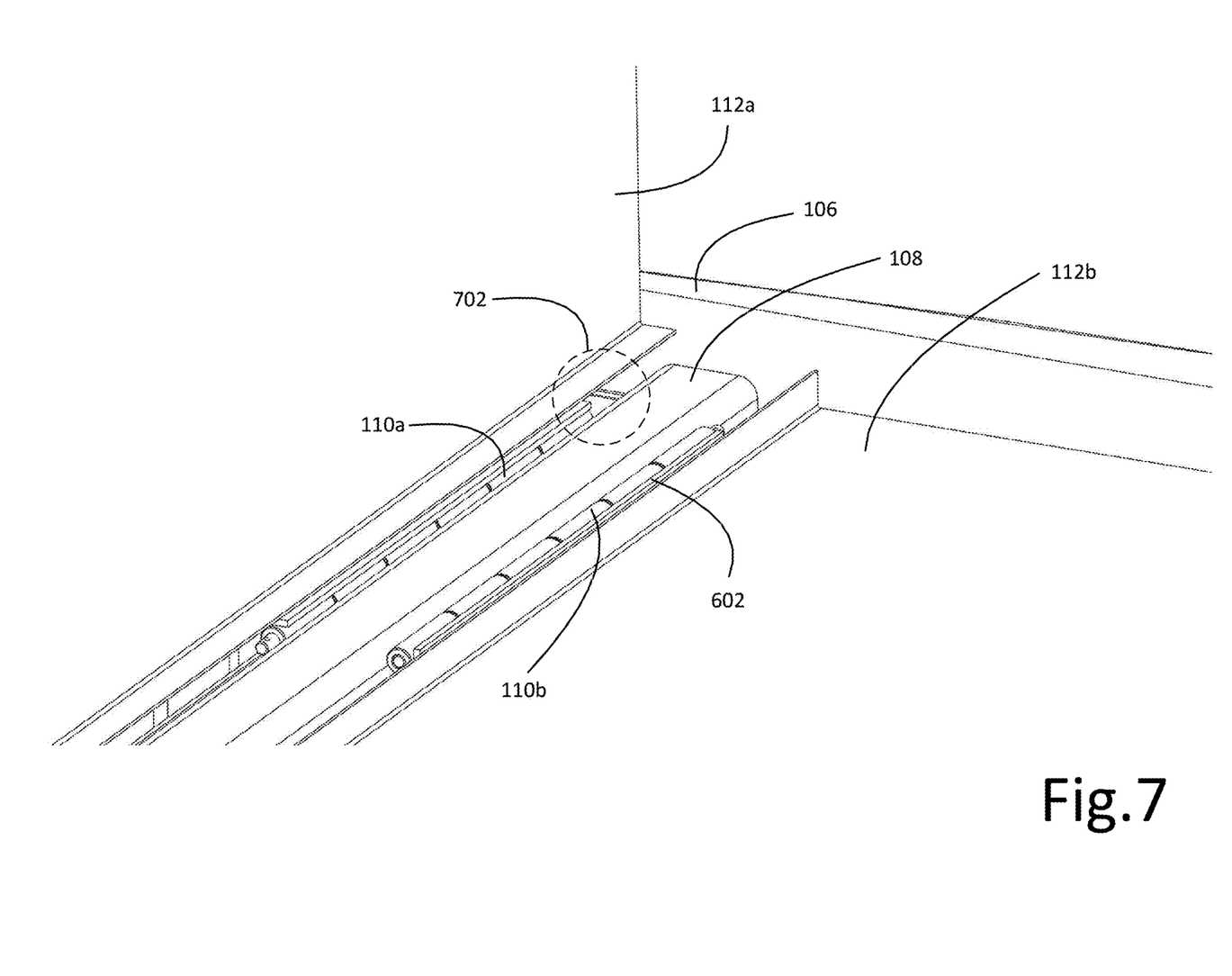
FIG. 7 illustrates a detailed outside view of a passenger-side gull wing door in an open position according to one embodiment of the present invention.

FIG. 7 illustrates a detailed outside view of a passenger side gull wing door in an open position and a driver side gull wing door in a closed position according to one embodiment of the present invention. More specifically, the view of FIG. 7 is from that of an observer standing above the main header member and looking down at the gull wing door assembly. From this vantage point, one is presented with an alignment of the main header member 108 affixed to the rear wall 106 and front wall (not pictured), which provides a frame upon which the passenger side gull wing door 112a and the driver side gull wing door 112b can be mounted.

The main header member 108 carries the passenger side hinge 110a and the driver side hinge 110b to which the passenger side gull wing door 112a and the driver side gull wing door 112b, respectively, are mounted. As with other embodiments, the embodiment of FIG. 7 utilizes a flange 602 to mate a given gull wing door 112a and 112b to the main header member 108. The arrangement may have the unintended consequence of forming a gap 702 between the main header member 108 and a given gull wing door 112a and 112b. An underlying drain trough 604, when utilized, may be operative to collect any rainwater or other precipitation that falls through the gap 702, routing such precipitation out and down one or more downspouts, which may be located on an exterior surface of the rear wall 106. Alternatively, routing may make use of alternative downspout structures, the internal structure of the rear 106 wall itself, etc.

Figure 8:
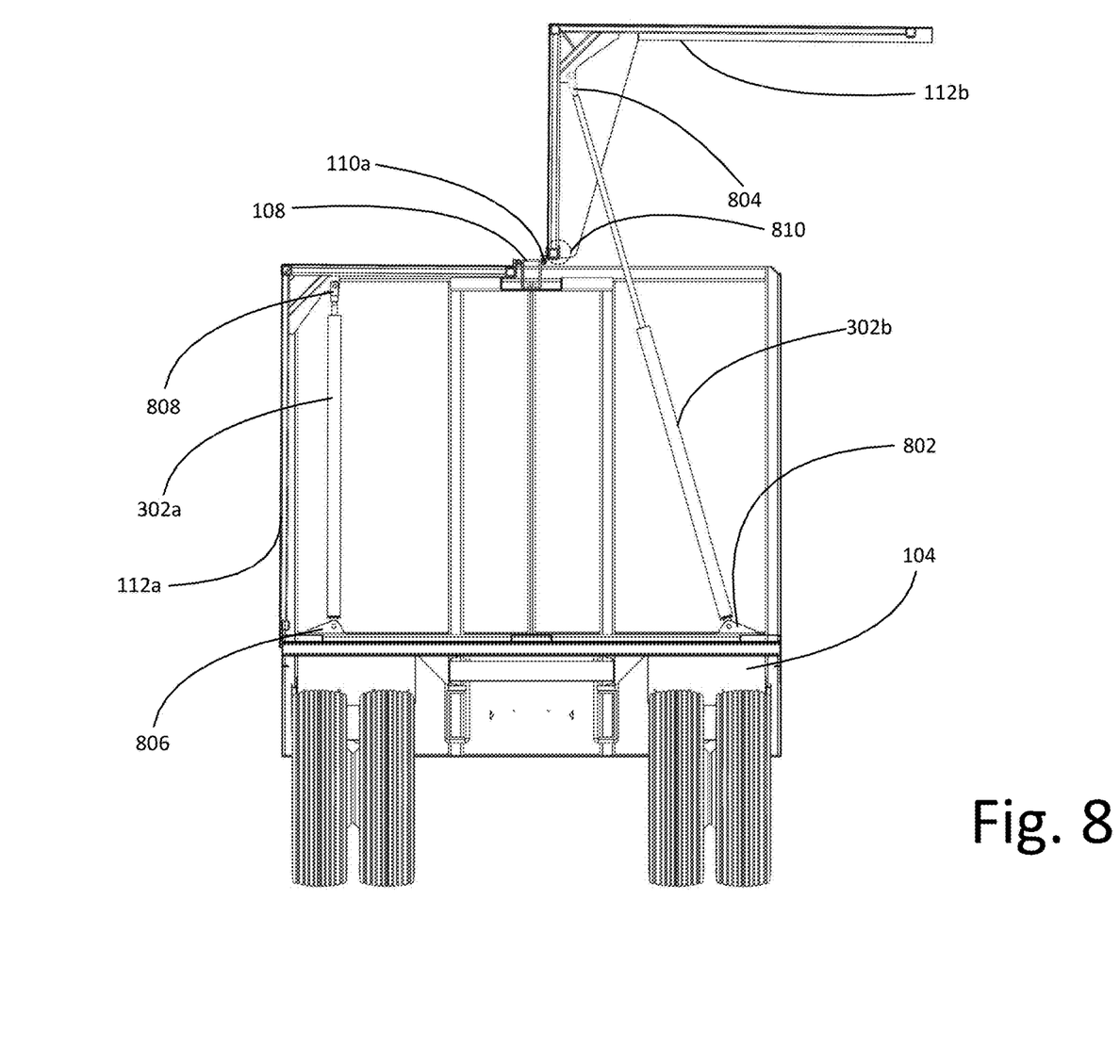
FIG. 8 illustrates a cross-sectional front-to-back view of a truck bed affixed with gull wing doors according to one embodiment of the present invention.

FIG. 8 builds on the prior views by illustrating a cross-sectional front-to-back view of a truck bed affixed with gull wing doors according to one embodiment of the present invention. In the view that FIG. 8 illustrates, the driver side gull wing door 112b is in the open position, whereas the passenger side gull wing door 112a is in the closed position. A given one of the gull wing doors is connected to a flange (detail 810) that interfaces with the main header member by way of a hinge, e.g., hinge 110a.

Various embodiments contemplate the use of various power sources in combination with various, disparate mechanical structures to raise and lower the passenger side gull wing door 112a and the driver side gull wing door 112b. In accordance with the embodiment of FIG. 8, a first hydraulic lift cylinder 302b is used in conjunction with raising and lowering the driver side gull wing door 112b and a second hydraulic lift cylinder 302a is used in conjunction with raising and lowering the passenger side gull wing door 112a. Beyond the use of hydraulic cylinders, other embodiments make use of gears, pullies, or other mechanical structures to distribute applied power and raise a given gull wing door from the closed position to the open position, as well as vice versa.

A number of disparate types of connectors can be used to attach the hydraulic lift cylinder to both a given one of the gull wing doors 112a and 112b and the truck bed 104. In accordance with the embodiment of FIG. 8, the upper connector 804 used to attach the hydraulic lift cylinder to a given one of the gull wing doors is a rod end threaded clevis fastener or a yoke-end linkage, whereby slight adjustments may be made to the length of the hydraulic lift cylinder by screwing the clevis further onto or off of the cylinder rod. Such fine adjustments allow for a given gull wing door to achieve proper alignment and, therefore, proper seal with the front and rear walls, as well as the truck bed 104. The lower connector 802 may be a tube end tombstone mount, which may attach between the double mounts on the truck bed 104 and provide a rotational joint to allow for movement of the hydraulic lift cylinder 302b. According to the present embodiment, similar structures are utilized in conjunction with the passenger side gull wing door 112a and passenger side hydraulic lift cylinder 302a. As used in conjunction with the driver side hydraulic lift cylinder 302b, the upper connector 808 used to attach the passenger side hydraulic lift cylinder 302a is a rod end threaded clevis fastener or a yoke-end linkage and the lower connector 806 is a tube end tombstone mount. Other styles and type of connectors that allow for or otherwise provide for a rotational style connection can be utilized as either the upper connector 804 or the lower connector 802, e.g., cross tube mounts, rod end barrel mounts, etc.

Figure 9:
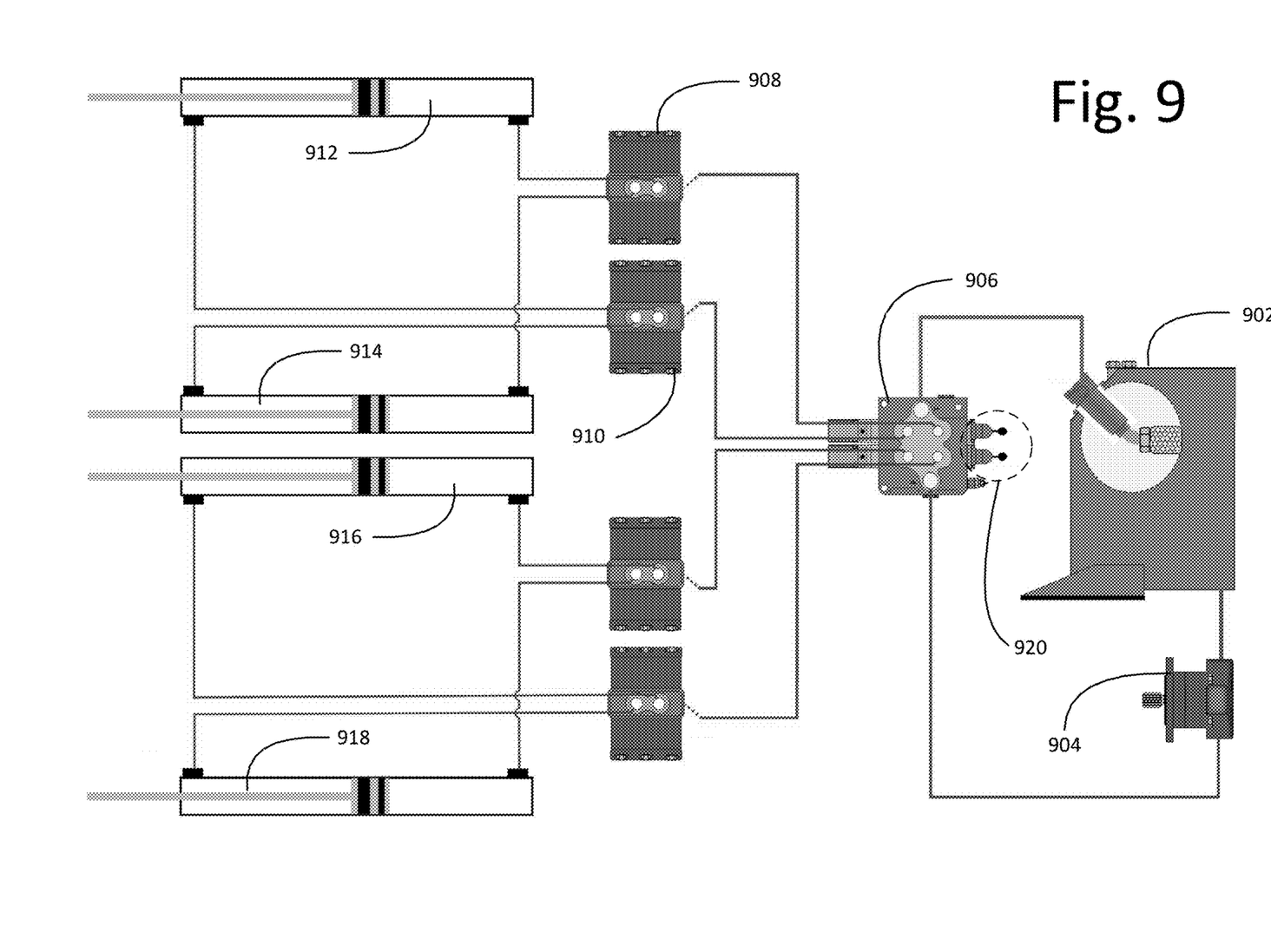
FIG. 9 illustrates a schematic of a hydraulic circuit to independently raise a set of lower gull wing doors affixed to a truck bed according to one embodiment of the present invention.

FIG. 9 presents a schematic illustrating one embodiment of a hydraulic system or circuit that is operative to independently raise a set of lower gull wing doors affixed to a truck bed in accordance with various embodiments of the present invention. Although the present embodiment presents the use of hydraulic pumps to power the hydraulic lift cylinders, other power sources are contemplated as falling within the scope of embodiments of the present invention.

The hydraulic system in accordance with the embodiment of FIG. 9 generally comprises several major components, including, but not limited to: a transmission mounted power take off ("PTO") (not pictured), a hydraulic tank 902, a geared hydraulic pump 904, a set of control valves that are part of a directional vale assembly 906, and a set of lift cylinders 912 and 914. Where a set of multiple lift cylinders 912 and 914 are used to lower and raise a given gull wing door, the hydraulic system may deploy and utilize a set of rotary flow dividers 908 and 910 to divide the incoming and outgoing flow of hydraulic fluid simultaneously to or from a given set of multiple lift cylinders 912 and 914.

According to one embodiment, the hydraulic system (pump, power take off, cylinders and valves) are engaged only from within the truck cab. Alternatively, or in conjunction with the forgoing, one or both of the gull wing doors, which can operate dependently or independently of one another, can be operated from a hand operated control valve, electronic remote control or wired pushbutton control pendant. Such operation may be limited to those situations only when the hydraulic system had been engaged from within the cab, which provides a layer of security and the ability to secure the body and its contents by the simple act of locking the truck cab doors.

The hydraulic circuit contains a single hydraulic tank 902 and pump 904, which may be driven by a transmission mounted power takeoff. The pump 904 provides oil to a central, multi valve bank containing cylinder spool valves 906 operative to operate two pairs 912/914 and 916/918 of cylinders, e.g., a driver side cylinder (set) and passenger side cylinder (set). The pairs of cylinders are attached to each end of a given gull wing door and plumbed together to both extend and retract simultaneously. Hydraulic oil is returned to the tank 902 from the valve bank through a return line filter. Depending of the length, however, a given gull wing door may be raised or lowered by a single hydraulic cylinder. Similarly, other embodiments may utilize a single hydraulic cylinder to raise a pair of gull wing doors, with the power delivered by the hydraulic cylinder distributed to the doors, e.g., though the use of a rack and pinion, a series of gears, etc.

According to various embodiments, a number of disparate control systems can be deployed for operation of the hydraulic circuit and, therefore, raising and lowering of the driver side gull wing door and the passenger side gull wing door. As depicted, the multi valve bank containing cylinder spool valves 906 that are operative to operate the cylinders comprises a manual control interface 920 that utilizes of a plurality of control levers, a given level operative to call hydraulic fluid to or from a given cylinder, i.e., raise or lower a given gull wing door. As an alternative to such body mounted switches or levers 920, switches or levers deployed within the truck cab may be utilized, which allows the driver to operate the doors while remaining within the cab, or remote control systems that are known to those of skill in the art may be utilized.

FIGS. 1 through 9 are conceptual illustrations allowing for an explanation of various embodiments of the present invention. Those of skill in the art should understand that various aspects of the implementations of the present invention could be implemented in other forms of hardware, or combinations thereof, to perform the functions of the present invention. That is, the same piece of disparate hardware could perform one or more of the illustrated blocks (e.g., components or steps).

Notably, the figures and examples above are not meant to limit the scope of the present invention to a single implementation, as other implementations are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an implementation showing a singular component should not necessarily be limited to other implementations including a plurality of the same component, and vice-versa, unless explicitly stated otherwise herein. Moreover, Applicant does not intend for any term in the specification or claims to be ascribed an uncommon or special meaning unless explicitly set forth as such. Furthermore, embodiments of the present invention encompass present and future known equivalents to the known components referred to herein by way of illustration.

The foregoing description of the specific implementations will so fully reveal the general nature of the invention that others can, by applying knowledge within the skill of the relevant art(s) (including the contents of the documents cited and incorporated by reference herein), readily modify and/or adapt for various applications such specific implementations, without undue experimentation, without departing from the general concept of the present invention. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various implementations of embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention, as illustrated by the exemplary embodiments presented herein, should not be limited by any of the above-described exemplary implementations, but should be defined only in accordance with the following claims and their equivalents.

What is claimed is:

1. An enclosure for protecting a load disposed upon a truck bed, the enclosure comprising:
   a truck bed to hold one or more items, the truck bed having a first end proximal to a truck cab and a second end distal to the truck cab;
   a front wall affixed to the proximal end of the truck bed and a rear wall affixed to the distal end of the truck bed;
   a main header member that runs along the length of the truck bed and connects the rear wall with the front wall to form a central mount point along a length of the truck bed that is disposed at a maximum height of the rear wall and the front wall;
   a passenger side gull wing door and a driver side gull wing door;
   a plurality of hinges affixed to the main header member to provide a movable joint on which the passenger side gull wing door and the driver side gull wing door are mounted;
   a pair of hydraulic lift cylinders, a given lift cylinder of the pair of lift cylinders operative to raise and lower a respective passenger side gull wing door or driver side gull wing door;
   a pair of weather resistant lips running along a passenger side of the rear wall and a driver side of the rear wall to engage with a lower portion of the passenger side gull wing door and a lower portion of the driver side gull wing door to seal any gap between the rear wall of the enclosure; and
   a drain trough attached below the main header member to collect precipitation that falls through a gap between the main header member and a given one of the passenger side gull wing door and the driver side gull wing door, whereby the drain trough flares towards the passenger side and the driver side as it approaches the rear wall and routes such precipitation through an internal structure of the rear wall.

2. The enclosure of claim 1 wherein a given one of the plurality of hinges is a barrel hinge.

3. The enclosure of claim 1 wherein a given one of the plurality of hinges is affixed to one or more segments of the main header member.

4. The enclosure of claim 1 comprising a generally rectangular sheet mounted along one edge to a length of the main header member and along another edge to a given one of the passenger side gull wing door and the driver side gull wing door.

5. The enclosure of claim 4 wherein the sheet is selected from the set of materials consisting of plastic, canvas, and waxed canvas.

6. The enclosure of claim 1 wherein a given one of the passenger side gull wing door and the driver side gull wing door creates clear span across approximately one half of the maximum width of the truck bed and the entire length of the truck bed.

7. The enclosure of claim 1 wherein a given one of the passenger side gull wing door and the driver side gull wing door comprises an internal skeletal tubing frame.

8. The enclosure of claim 1 wherein a given hydraulic lift cylinder operates independently and can independently be in an open or closed orientation.

9. The enclosure of claim 1 wherein the pair of hydraulic lift cylinders operate in a dependent fashion.

10. The enclosure of claim 1 wherein a given hydraulic lift cylinder is mounted at a first end to the truck bed by a connector that provides a rotational joint that allows for movement of the hydraulic lift cylinder.

11. The enclosure of claim 10 wherein the connector is selected from the set of connectors consisting of a tube end tombstone mount.

12. The enclosure of claim 1 wherein the truck bed comprises a central member and plurality of side members, all of which run the length of the truck bed.

13. The enclosure of claim 12 wherein the truck bed comprises a plurality of cross members that interconnect the central member with the plurality of side members to provide rigidity to the truck bed.

* * * * *